(12) United States Patent
Levidow et al.

(10) Patent No.: US 7,734,945 B1
(45) Date of Patent: Jun. 8, 2010

(54) AUTOMATED RECOVERY OF UNBOOTABLE SYSTEMS

(75) Inventors: Bjorn B. Levidow, Bellevue, WA (US); Yi Meng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 584 days.

(21) Appl. No.: 11/117,846

(22) Filed: Apr. 29, 2005

(51) Int. Cl.
*G06F 11/00* (2006.01)
(52) U.S. Cl. ................................................. 714/3
(58) Field of Classification Search ........................ 714/48
See application file for complete search history.

(56) References Cited

U.S. PATENT DOCUMENTS

| | | | | |
|---|---|---|---|---|
| 5,974,546 | A * | 10/1999 | Anderson | 713/2 |
| 6,014,744 | A * | 1/2000 | McKaughan et al. | 713/2 |
| 6,119,246 | A * | 9/2000 | McLaughlin et al. | 714/27 |
| 6,654,910 | B1 * | 11/2003 | Eibach et al. | 714/37 |
| 6,779,110 | B1 * | 8/2004 | Aguilar et al. | 713/2 |
| 6,948,099 | B1 * | 9/2005 | Tallam | 714/38 |
| 7,259,666 | B1 * | 8/2007 | Hermsmeyer et al. | 340/517 |
| 7,516,362 | B2 * | 4/2009 | Connelly et al. | 714/26 |
| 2003/0023839 | A1 * | 1/2003 | Burkhardt et al. | 713/1 |
| 2004/0158699 | A1 * | 8/2004 | Rhoads et al. | 713/1 |
| 2005/0204123 | A1 * | 9/2005 | Lee | 713/2 |
| 2005/0283638 | A1 * | 12/2005 | Kato | 714/2 |
| 2006/0059496 | A1 * | 3/2006 | Joy et al. | 719/310 |
| 2006/0085630 | A1 * | 4/2006 | Challener et al. | 713/2 |
| 2006/0112061 | A1 * | 5/2006 | Masurkar | 706/47 |
| 2006/0150167 | A1 * | 7/2006 | Ziegler et al. | 717/143 |
| 2006/0233114 | A1 * | 10/2006 | Alam et al. | 370/252 |
| 2007/0011493 | A1 * | 1/2007 | Du et al. | 714/36 |

OTHER PUBLICATIONS

Press Release—"Winternals Recovery Manager 2.0 Provides Rapid, Reliable System and Date Recovery" [online] (Apr. 4, 2005) (printed Oct. 2005) (3 pages).
"Winternals Recovery Manager Quick Start Guide" [online] (Mar. 2005) (8 pages).
Winternals "Recovery Manager 2.0 User's Guide" [online] (printed Oct. 2005) (148 pages).
Winternals "Recovery Manager: Product Overview" [online] (printed Oct. 2005) (3 pages).
"Phoenix FirstWare Recover Pro Version 2.0" [online] (Aug. 7, 2003) (42 pages).
"Phoenix FirstWare Recover Version 2.3" [online] (Aug. 8, 2003) (14 pages).
"Remote Recover" [online] (Apr. 8, 2002) (printed Oct. 2005) (2 pages).
"NTRecover" [online] (Jul. 9, 1997) (printed Oct. 2005) (2 pages).
"Bugslayer" [online] (Jun. 2002) (printed Oct. 2005) (9 pages).

* cited by examiner

*Primary Examiner*—Scott T Baderman
*Assistant Examiner*—Yair Leibovich
(74) *Attorney, Agent, or Firm*—Marshall, Gerstein & Borun LLP

(57) ABSTRACT

Provided is a system to automatically recover a computer system after a failed attempt, or failed attempts, to boot a target operating system on the computer system.

15 Claims, 11 Drawing Sheets

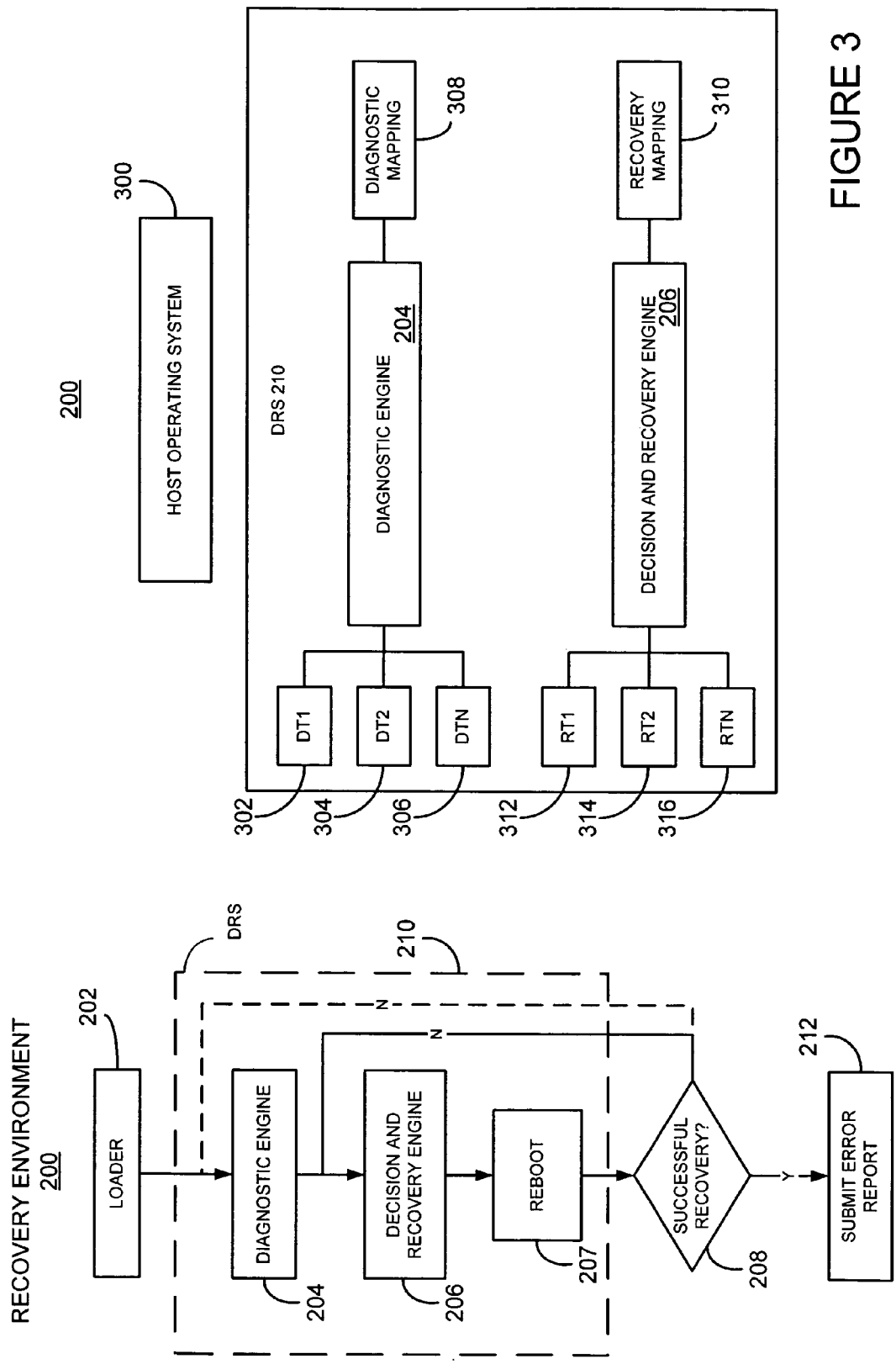

AUTOMATED RECOVERY OF UNBOOTABLE SYSTEMS

FIELD OF THE DISCLOSURE

The present disclosure relates generally to boot processes for a computer system and, more particularly, to repair of computer system boot processes.

BACKGROUND OF RELATED ART

Boot start up problems limit system performance and can lead to undesirable down time and in extreme situations, the user deeming the machine as unrecoverable. This can ostensibly create a situation where data is lost, not by necessity, but by lack of experience or frustration. The source of boot problems abound and can come from registries getting corrupted, system files corruption, service problems, and missing drivers, to name a few.

In conventional systems, a user is left to determine what is causing the problem in order for the user to be able to fix the problem. There are no effective ways to diagnose problems that occur, i.e., the problems that caused the boot failure. Instead, conventional systems at most provide manual recovery that seeks to restore some previous stored default or "safe" boot environment. The most common examples are recovery boot disks or a user's ability to boot from the original CD-ROM of the operating system. The process is manually operated, because the computer system polls the user to initiate recovery.

Some systems attempt to expedite boot start-up upon a boot failure by storing multiple basic input/output system (BIOS) initial memory locations in hardware or firmware. The BIOS, the main operating system BIOS, may start up via executing a boot loader sequence starting at a fixed, stored memory location of a boot block. If that main boot loader sequence does not initiate, then the firmware/hardware may instruct the system to go to a second memory location of the boot block to execute a "safe" boot loader sequence, for example, a separately stored, factory default boot loader sequence. Of course, in practice such systems are incomplete.

These systems do not actually diagnose the reasons for boot failure; instead they are based on restoring the system state to a previously bootable one, irrespective of the cause of the failure. These systems require a separate recovery disk, which in some circumstances may not be available, either because the disk is not available or because the failure to even initialize drivers in the computer system means that the computer system does not recognize its own CD-ROM, floppy, Universal Serial Bus (USB), or other drives. Plus these techniques are only directed to the situation where memory location access and code execution is affected. That is, the techniques are only directed to problems right at the earliest stages of start-up. These systems do not address or correct for boot problems that arise after the boot loader has started.

SUMMARY

In some examples, a system provides an automatic or manual recovery from a failure to boot into the main operating system partition on a computing system. After a number of failed consecutive boot attempts have occurred, a boot manager may automatically boot a host operating system, which may be stored on a partition different than the operating system partition. A diagnostic and recovery environment may execute under the host operating system, to automatically execute a series of diagnoses of pre-operating system and operating system boot processes to determine a root cause of the boot failure. Once a root cause has been identified, the environment may identify a recovery action to take in response to that root cause and execute that recovery action. For some root causes, the environment may decide that no recovery action is available or the environment may poll a user to allow the environment to execute a particular recovery action, such as those recovery actions that may alter the computing system in way that may be unacceptable to a user. The environment may repeat diagnosis and recovery until an appropriate recovery action is taken, and the computing system is able to successfully reboot. Once all of the recovery operations have been taken and the main operating system has booted successfully, the user may be asked if they would like to submit the event report.

Some of the example systems may include a computer readable medium having computer executable instructions for performing steps of recovering from boot failure of a target operating system on a computer system comprising: determining the occurrence of the boot failure; identifying a root cause of the boot failure; in response to the identification of the root cause, identifying a recovery action associated with the root cause; and executing the recovery action on the computer system.

BRIEF DESCRIPTION OF THE DRAWINGS

FIG. 2 illustrates an recovery environment for the computing system of FIG. 1;

FIG. 3 illustrates an example implementation of the recovery environment of FIG. 2;

DESCRIPTION

Although the following text sets forth a detailed description of numerous different embodiments, it should be understood that the legal scope of the description is defined by the words of the claims set forth at the end of this patent. The detailed description is to be construed as illustrative only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
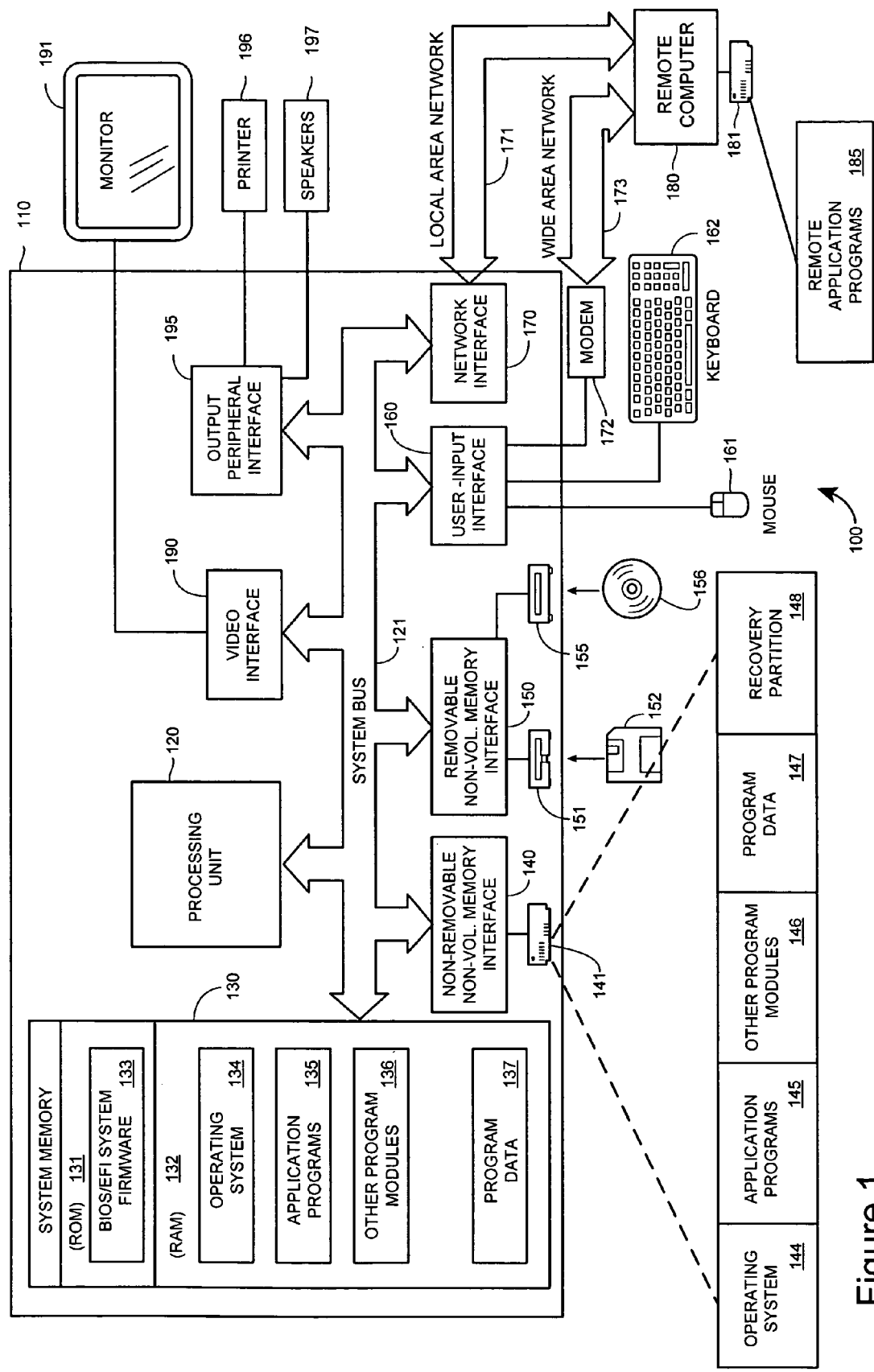
FIG. 1 is a block diagram of a computing system that may operate in accordance with the claims.

FIG. 1 illustrates an example of a suitable computing system environment 100 on which a system for the blocks of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

The blocks of the claimed method and apparatus are operational with numerous other general purpose or special purpose computing system environments or configurations. Examples of well known computing systems, environments, and/or configurations that may be suitable for use with the methods or apparatuses of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The blocks of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. Depending on the type of computer system 110, a BIOS or Extensible Firmware Interface (EFI) system firmware 133 containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. In some examples, the hard disk 141 may also include a recovery partition 148 that stores a recovery environment, as discussed below. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

During normal boot operation, a user activates the computer system 110 initiating a boot sequence to execute the target operating system 144. FIG. 2 illustrates a recovery environment 200 for the computer system 110 that may be used to recover the computer system 110 in the event of a failed attempt to boot this target operating system 144. The recovery environment 200, for example, may present a host operating system bootable on the computer system 110, but different than the target operating system 144, and execute boot diagnostic and recovery processes over that host operating system to recover the computer system 110 and boot the target operating system 144. By way of example, the computer system 110 may automatically failover to the recovery environment 200 after a set number of failed boot attempts, indicating a boot failure, have been detected. The recovery environment 200 may then diagnose the root cause of the boot failure, determine a recovery action, and execute that recovery action to address the root cause. The diagnosis and recovery processes of the recovery environment 200 may then automatically recover the computer system 110, or the recovery environment 200 may allow the user to manually guide the recovery process, for example by presenting the user with available recovery actions and allowing the user to select from among the listing. The recovery environment 200 may perform repeated diagnosis and recovery operations until the computer system 110 successfully reboots. In some examples, the recovery environment 200 may undo changes made to the computer system 110 during unsuccessful recovery attempts, by temporarily storing data obtained during the diagnosis and recovery process and replacing that data. Generally, and by way of example not limitation, the recovery environment 200 may recover from failures during the boot processes, failures caused by registry corruption, missing or damaged system files, hardware failure, buggy drivers or damaged driver files on the computer system 110.

In the example of FIG. 2, the recovery environment 200 includes a loader 202, a diagnostic engine 204, and a decision and recovery engine 206. The loader 202, for example, may determine the occurrence of boot failure, for example, after a boot manager on the computer system 110 detects a specified number of failed boot attempts of the target operating system 144 and launches the recovery environment 200. The loader 202 may also perform preliminary checks to determine whether the recovery environment 200 should execute at all. For example, the loader 202 may be programmed to prevent the recovery environment 200 from executing when the computer system 110 has successfully booted into the target operating system 144. By way of example not limitation, the loader 202 may upon start-up check for the presence of a registry key indicating whether the target operating system 144's previous attempt to boot succeeded or not.

The recovery environment 200 may diagnose various boot processes, including components, files, and directories, to ascertain the root cause for a boot failure. For example, the recovery environment 200 may diagnose boot processes for computer systems that use a BIOS and master boot record (MBR) to effect system boot, as well as for computer systems that use EFI and a globally unique identifier (GUID) partition table (GPT) to achieve system boot. Example computer systems using EFI boot processes include those based on the IA64 microprocessor architecture, such as the ITANIUM processors available from Intel Corporation, Santa Clara, Calif. This is by way of example, not limitation. 32 Bit microprocessor architectures may support EFI boot processes as well. These two types of boot processes are provide by way of example, not limitation; the recovery environment 200 is not limited to recovering a particular boot process.

The diagnostic engine 204, for example, may diagnose pre-operating system boot processes, e.g., system-wide processes, components, and data that are not specific to an operating system, as well as operating system boot processes (including components and data) specific to the target operating system. By way of example not limitation, the diagnosis of pre-operating system boot processes in BIOS-based systems may include a diagnosis of boot initiation data, such as the BIOS start up phase after a Power-On Self Test (POST), a diagnosis of the MBR, including boot configuration data, and a diagnosis of the system volume. The examination of pre-operating system boot processes may include a diagnosis of partition tables and partition data such as the boot sector. The diagnosis of pre-operating system boot processes in an EFI-based system may include that of boot initiation data (such as the EFI start up phase and boot sector and the EFI boot manager), as well as that of the GPT.

The diagnosis of operating system boot processes may include diagnosing the boot processes for the operating system, such as some of the processes executed by a boot manager and the boot processes of the operating system loader and the operating system itself. The diagnosis of operating system boot processes may include reviewing logs created or associated with the target operating system, such as a boot manager log, an operating system loader log, crash dump data, and data logged while the target operating system was last running. By way of example, not limitation, the logged information may include logged data on the registry, a bad hard disk, bad RAM, missing system files, missing or damaged boot configuration data, damaged file system, missing drivers, damaged drivers, problem drivers, known boot failures, and unknown boot failures. Some of this logged information may be accessed during the diagnosis of the pre-operating system boot processes, as well. In general, the diagnosis may also include file system level checks, boot volume checks, and hard disk checks. These examples of pre-operating system and operating system boot processes diagnoses are provided for example purposes, and not limitation.

For explanation purposes, the diagnostic and recovery processes of the recovery environment 200, for example, those of the diagnostic engine 204 and the decision and recovery engine 206 will be collectively termed a diagnostic and recovery system (DRS) 210. The engine 204 identifies a root cause or root causes to the decision and recovery engine 206, which then identifies and executes appropriate recovery actions to address the root cause. For example, the recovery action may include one or more executable recovery tools associated with the various possible root causes through a recovery tool mapping, and the engine 206 may execute these recovery tools in sequence starting with a primary or higher priority tool and moving to subsequent tools, if necessary, until the computer system 110 successfully reboots. Each recovery action may be taken sequentially and separately until the computer system 110 successfully reboots, although multiple recovery actions may be taken before attempting to reboot the system.

In the illustrated example, the recovery environment 200 reboots the computer system 110 at block 207 after a recovery tool has been executed. After reboot, a decision block 208 determines if the computer system 110 was successfully recovered after execution of the recovery tool. If not, then block 208 may return control to the engine 206 for implementation of another recovery tool associated with the root cause or the block 208 may return control to the engine 204 (dashed line) for identification of another root cause. Upon a successful reboot, the block 208 may pass logged diagnostic and recovery data to block 212 for error reporting, for example, through a network interface 170 to the remote computer 180, such as a customer service center. The block 212 may also undo some of the changes made by the DRS 210 during a successful diagnosis and recovery operation, for example changes to disk data structures such as a boot code or boot sector. In some examples, the recovery environment 200 may report diagnostic and recovery data to a remote computer, such as, where the recovery environment 200 is unable to recovery the computer system 110.

Recovery may be achieved for root causes related to the pre-operating system boot processes as well as the operating system boot processes. By way of example not limitation, recovery as used herein may include the repair of a root cause, the removal of a root cause, or the avoidance of the underlying execution associated with a root cause.

The recovery environment 200 may be stored on the hard disk 141 in a boot volume separate from the system volume storing the target operating system. For example, the recovery environment 200 may be stored in the recovery partition 148, which may be hidden or locked from the user to protect the recovery environment 200 from alteration or corruption. More generally, the recovery environment 200 may be stored on any portion of the hard disk 141 or other storage disk, whether within the computer system 110 via the interface 140 or coupled thereto, for example via the network interface 170. In other examples, the recovery environment 200 may be stored on the nonvolatile optical disk 156, e.g., on CD-ROM or DVD-ROM, for example, on the operating system set-up CD-ROM. In other examples, the recovery environment 200 may be stored on other removable storage media. Further still, the entire recovery environment 200 may be stored within a single boot volume on a single hard disk, nonvolatile optical disk, removable storage, or other storage medium, or part of the recovery environment 200 may be distributed across of a number of different volumes, including the system volume, or a number of different storage media. These are provided by way of example, not limitation.

FIG. 3 illustrates an example component level diagram of an implementation of the recovery environment 200, where the environment 200 includes a host operating system 300 that serves as a recovery operating system. By way of example and not limitation, the host operating system 300 may be the same operating system as the target operating system 144, yet alternatively the two operating systems may be different. More generally, the target operating system 144 and the host operating system 300 may be any two operating systems bootable on the computer system 110, such as for example two operating systems that share file system infrastructure, kernels, basic system drivers, and memory stack mappings. Further still, the host operating system 300 may be a rendition of the target operating system 144, for example, the host operating system 300 may contain the file system infrastructure, kernel, basic system drivers, and memory stack mapping of the target operating system 144 but lack the full graphical user interface of the target operating system 144. By way of example, the target operating system 144 may be WINDOWS, and the host operating system 300 may be a WINDOWS Preinstallation Environment (WINDOWS PE) operating system, both available from Microsoft Corporation of Redmond, Wash. WINDOWS PE contains components of WINDOWS, but may not contain all features of WINDOWS. Further still, the host operating system 300 may share components with the target operating system 144, or access components of the target operating system 144, for example, from the system volume.

In the illustrated example, the diagnostic engine 204 accesses multiple diagnostic tools, 302, 304 and 306, which each may diagnose a different process or component of the boot process for the computer system 110, for example different pre-operating boot processes and operating system boot processes. Three diagnostic tools are shown by way of example, not limitation. In an example implementation, to determine a root cause from the diagnostic data obtained via execution of the tools 302-306, the diagnostic engine 204 may access a diagnostic mapping table 308 that maps diagnostic data to various root cause data. This mapped data may be integral with the engine 204.

With a root cause identified, to determine an appropriate recovery tool, the decision and recovery engine 206 is coupled to a recovery mapping table 310 that maps root cause data to recovery tool data, where the recovery tool data identifies a recovery tool to be executed to recover the computer system 110 from the identified root cause. This mapped data may be integral with the engine 206. The diagnostic and recovery engine 206 is also coupled to a variety of recovery tools 312, 314 and 316, three recovery tools being shown by way of example not limitation. Although shown separately, diagnostic and recovery tools may be combined into a single tool that may be used to recover from boot failure.

In the illustrated example, the diagnostic tools 302, 304 and 306 and the recovery tools 312, 314 and 316 are shown as part of the recovery environment 200, where for example they may be stored on the recovery partition 148, in examples where the recovery environment 200 is stored on recovery partition 148. The DRS 210 may be extensible, however, and able to use external diagnostic and recovery tools.

Figure 4:
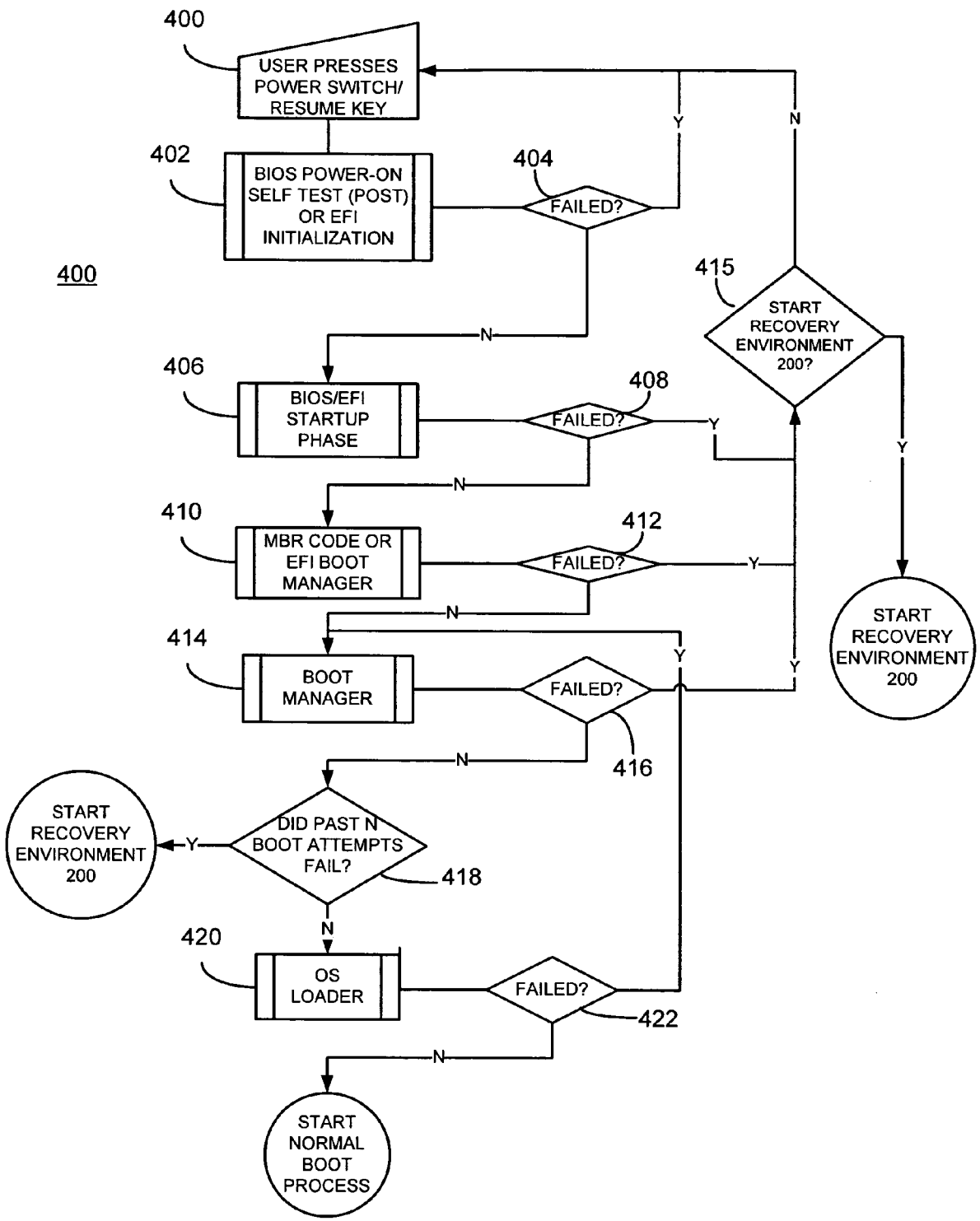
FIG. 4 illustrates an example automatic failover configuration for initiating a recovery environment.

An example implementation of automatic failover to the recovery environment 200 is shown in FIG. 4 and is described with reference to example boot processes pertaining to BIOS-based and EFI based system, for explanation purposes. A user initiates the boot process by depressing a power switch, awake switch, resume key, or the like, at 400. Depending on the type of boot process, a BIOS power-on self test (POST) or an EFI initialization occurs at 402. If a boot failure occurs from execution at block 402, e.g., in the event of a hardware malfunction, an incompatible BIOS configuration, an incompatible firmware or firmware settings, then a block 404 re-initiates the process, for example, by restarting the computer system 110. If no boot failure occurs at 402, control is passed to a BIOS or EFI startup phase at block 406, and a block 408 determines if there is a boot failure at block 406, for example, if there is a corrupted boot code or corrupt records (such as with the MBR) or a corrupted partition table. If no boot failure occurs at block 406, control is passed to an MBR or an EFI boot manager 410. A block 412 determines if there is a boot failure at block 410, for example, if there is a corrupted partition table, missing or corrupted boot sector, or a missing or corrupted boot manager. If there is no boot failure during these pre-operating boot processes of blocks 402, 406 and 410, control is passed to a boot manager 414 for starting the operating system boot process to initiate the target operating system 144.

In the illustrated example, if a failure is detected at blocks 408 and 412, control is passed to optional block 415 which may determine if the recovery environment 200 should automatically start to recover from the boot failure. For example, the block 415 may poll the user for insertion of a recovery media, like a CD-ROM. The block 415 may then execute an early boot metadata recovery tool, such as those described in U.S. application Ser. No. 11/117,861, entitled "Automatic Detection and Recovery of Corrupt Disk Metadata," Patel et al. filed on Apr. 29, 2005, and expressly incorporated herein by reference. If no recovery is selected or if the block 415 is timed out, then the computer system 110 is rebooted.

In the example of FIG. 4, if the boot manager 414 logs a failed boot, for example, where there is missing or corrupted boot configuration file or a missing or corrupted loader, a block 416 passes control to a block 415. Otherwise, control is passed to a block 418 which may access the log data, e.g., in the configuration file, to determine if a pre-determined number of boot attempts have failed, for example two boot attempts. If yes, then control is passed to the recovery environment 200 for initiation of the host operating system 300 and execution of the DRS 210. If the computer system 110 has not failed to boot the pre-determined number of times, then the process 400 seeks to allow the target operating system to initiate. In particular, the computer system 110 attempts to complete the boot process via operating system boot loader 420 which attempts to load the target operating system 144. If the system is unable to boot, for example if there is a missing or corrupted system registry or system files, then control is passed to the boot manager 414 for another boot attempt, via block 422, whereas if the operating boot loader 420 successfully accesses an acceptable system registry and system files, the normal boot process starts at 424 for loading of the target operating system 144.

Example Boot Manager

To failover to the recovery environment 200, the boot manager 414 may be programmed to log the number of boot failures for the computer system 110, and the boot manager 414 may be programmed to automatically initiate the recovery environment 200 after a set number of boot failures has occurred. For example, upon each boot failure, a counter may be updated in a page dump file (e.g., a Bootstat.cfg file) to note the number of boot failures that have occurred in a row. Upon a successful boot into the target operating system, the operating system may clear the counter in this file. When the number of boot failures recorded in the counter exceeds the threshold, for example a threshold set in a separate data file (e.g., a bootcfg.dat file) the boot manager 414 may automatically initiate a boot into the recovery partition 148 of memory storing the recovery environment 200. If the recovery environment 200 is stored on the hard disk 141, the recovery environment 200 may be launched via the boot manager without user interaction. Alternatively, or separately, the user may launch the recovery environment 200 via a boot interrupt procedure, such as from a boot menu upon activation of an interrupt keystroke such as F8. The block 415 may represent this manual activation, where if the user does not attempt to manually initiate the recovery environment 200, the computer system 110 will reboot.

If the recovery environment 200 is available only on a CD-ROM, DVD, or other insertable storage media, the boot manager may prompt the user to insert such media, whereafter the computer system 110 may then automatically launch the recovery environment 200. For the latter launch procedure, the computer system 110 may need to be configured to boot from the recovery media device. For example, if the recovery media is on a CD-ROM, the computer system 110 needs to be configured to boot from the CD-ROM, as might be useful if drivers for the CD-ROM have not been loaded due to the failed boot. From a setup CD-ROM, in particular, the setup CD-ROM may present the user with a menu of tasks to perform, where one of the tasks may be to start the recovery environment 200, as a technique to launch the same.

Example Pre-Operating System Boot Crash Dump

As illustrated in FIG. 4, boot failures can occur during early boot processes. Heretofore, if a computer system failed to boot during these early boot processes, no dump was captured because the page dump file had not been created yet. This is because with conventional systems, a page dump file is created upon operating system start-up, after the physical memory manager creates the virtual memory on the hard disk, where the page dump spans contiguous disk sectors. The boot manager 414, however, may be programmed to write out boot failure data before this virtual memory is created, for example, as soon as the file system is set up. By way of example, the boot manager 414 may access a page dump file from a previous boot process on the computer system, e.g., the previous most successful boot process, and add log data to this previous crash data.

In some examples, the boot manager 414 or the operating system loader 420 may log boot failures that result from a boot process hang, for example, where the operating system boot process takes a very long to complete or is stuck in an infinite loop and never completes. Such hangs can occur for a number reasons including a bug in an entry point or start routine, or a mismatched device driver and hardware. The boot manager 414 or operating system loader 420, for example, may have watchdog timers at various points in the kernel and convert long execution times into boot failure data, which is logged by the boot manager. In this way, the computer system 110 may automatically failover to the recovery environment 200 from boot hangs as well.

Example Diagnostic Process

Figure 5:
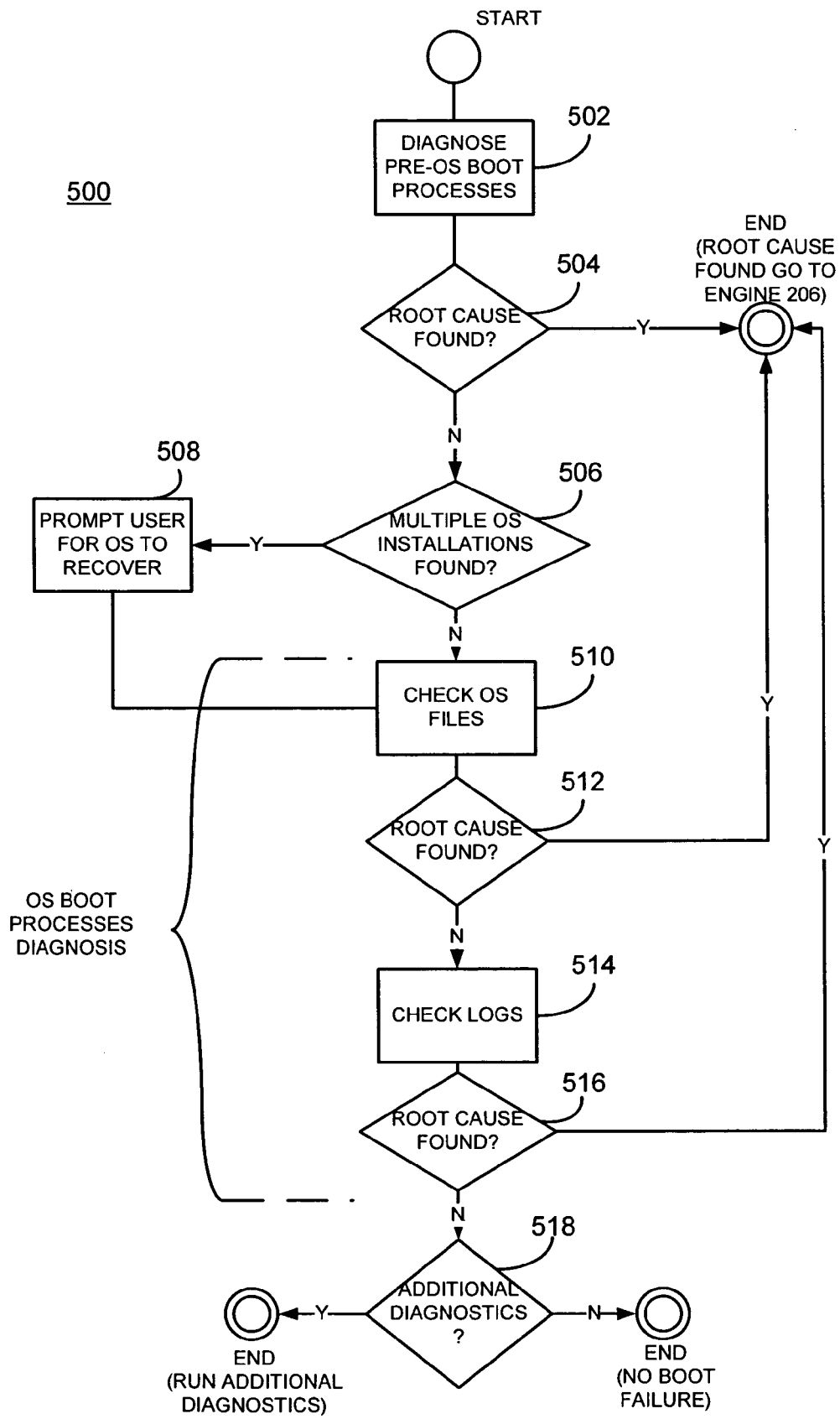
FIG. 5 illustrates an example diagnosis operation for a recovery environment, showing a diagnosis of pre-operating system boot processes and a diagnosis of operating-system boot processes.

FIG. 5 illustrates an example implementation of the diagnostic engine 204 showing example implementations of the diagnosis of pre-operating system and operating system boot processes. A diagnostic process 500 initiates, and a block 502 performs a diagnosis of pre-operating boot processes, such as those of the blocks 402, 406, 410 and 414. Example implementations of the diagnoses of pre-operating system boot processes are described below with reference to FIGS. 8A and 8B. A block 504 determines if a root cause has been found by block 502 and identifies that root cause and ends the process 500 passing control to the decisional and repair engine 206. Alternatively, the block 504 passes control for diagnosis of operating system boot processes.

With this diagnostic testing, the DRS 210 first determines if multiple target operating systems exist via block 506, for example where multiple installations of the target operating system 144 exist on the system. If multiple operating systems exist, and to avoid recovering an undesired operating system, the DRS 210 prompts the user to identify the particular operating system to recover at block 508 if it cannot be determined automatically.

In the illustrated example, the operating system diagnosis begins at a block 510, which checks operating system boot directories and files to identify any errors therein that may be the root cause. If errors are found, the process 500 ends via block 512 with an indication of the root cause, otherwise, the DRS 210 continues and, at block 514, checks various logged data related to the boot process. The block 514, for example, may analyze a boot manger log, an operating system loader log, a crash dump file, an operating system log, such as a driver installation log for the target operating system 144, and self-monitoring analysis and reporting technology (SMART) disk data. Example implementations of the operating system diagnoses performed by blocks 510 and 514 are described below with reference to FIGS. 10A and 10B. If root causes are found, then they are identified by block 516 and the process ends. Otherwise, in the illustrated example, a block 518 determines whether to perform additional diagnostics or end.

The process 500 identifies a root cause based on its diagnostics. At this point, the identified root cause is a potential root cause, because after a recovery attempt and reboot, the recovery environment 200 may determine that the computer system 110 has not been recovered and that additional diagnostic processes should be executed to identify another potential root cause or another, recovery tool to address the root cause. It is noted that while the process 500 is described as ending after the identification of a root cause, the process 500 may instead perform all diagnostic testing, identifying all possible root causes and provide that collective data to the decision and recovery engine 206 for sequential repair.

These processes are provided by way of example not limitation. Additional, fewer, or alternative processes may be used instead.

Example Decision and Recovery Process

Figure 6:
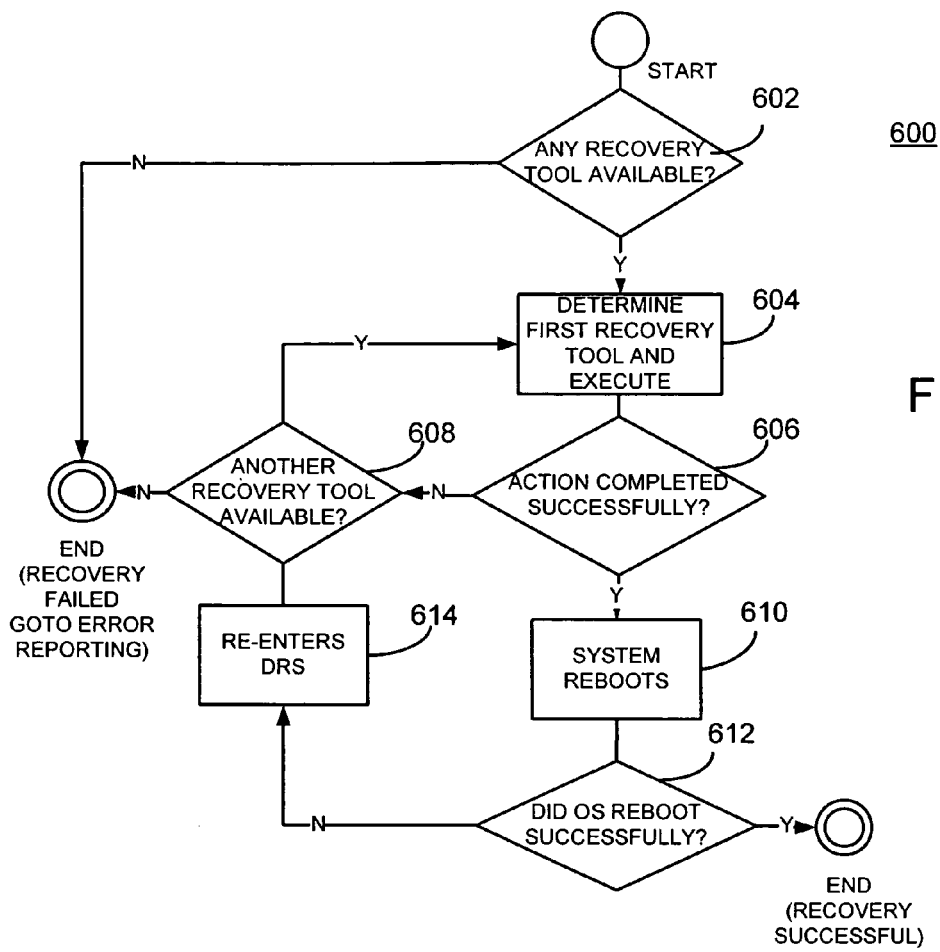
FIG. 6 illustrates an example decision and recovery operation for a recovery environment.

FIG. 6 illustrates an example implementation of a decision and recovery process 600 for the engine 206 initiated by the identification of a potential root cause in the diagnostic engine 204. The decision and recovery process 600 initiates and, in the illustrated example, determines at block 602 if a potential recovery tool exists for recovery from the identified root cause. If no recovery tool exists, the process ends and control is passed to block 208 of FIG. 2. The block 602, for example, may access a recovery table stored on the hard disk 241 that maps root causes to a recovery tool or recovery tools previously identified as candidates for recovery of the system in response to that root cause. As multiple recovery tools (such as multiple of the tools 304-316) may be capable of recovering from a single root cause, a block 604 identifies a primary or first recovery tool (or the recovery tool if there is only one) and executes that recovery tool. The block 604, for example, may identify a preferred recovery tool among the list of available recovery tools, such as a least destructive recovery tool, the recovery tool identified in the mapping table as most likely to succeed, or the most recently successful recovery tool. These decisional criteria are provided by way of example, not limitation.

With a recovery tool identified, a block 606 determines if the recovery tool was successful in recovering from the boot failure, e.g., repairing the root cause. For example, the block 606 may check to see if a repair actually finished successfully or not. If not, then a block 608 determines if another tool is available and selectively returns control to the decision block 604 for executing another recovery tool or to end the process 600. If the recovery tool successfully completes, then the DRS 210 reboots the system at block 610. Even after the DRS 210 identifies a recovery tool as successful, the computer system 110 may fail to boot, for example, where multiple root causes exist and only one has been repaired. As such, the illustrated example of FIG. 6 provides post system reboot processes in the form of a block 612 which determines if the target operating system 144 boots successfully after block 610 and if not passes control to a block 614 within the DRS 210 for automatic re-entry into the decision and recovery engine 206, thus bypassing the diagnostic engine 204 and reentering at a point to identify whether another recovery tool is available. In this way, the DRS 210 may optimize boot recovery in a reboot situation by assuming that the root cause identified by the diagnostic engine 204 is still the problem root cause, thereby reducing recovery time in reboot situations. In the event all recovery tools associated with the root cause have been identified, control may pass directly to the diagnostic engine 204 after a failed reboot.

These processes are provided by way of example not limitation. Additional, fewer, or alternative processes may be used instead.

Example Diagnosis and Recovery System (DRS)

Figure 7:
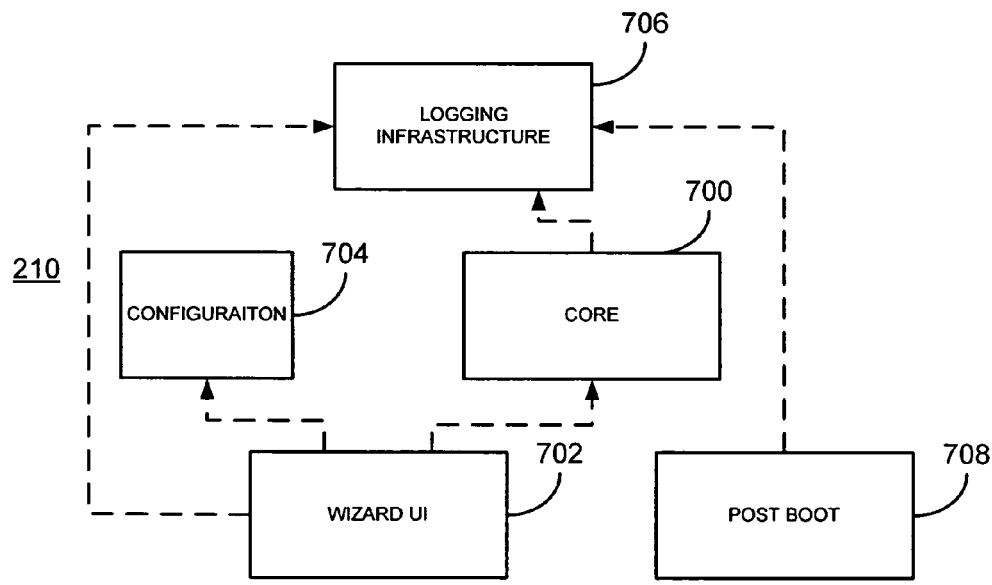
FIG. 7 illustrates an implementation of a diagnosis and recovery system that may be part of a recovery environment.

In the example of FIG. 7, the DRS 210 includes a core 700, a wizard user interface (UI) 702, a configuration manager 704, a logging infrastructure 706, and a post boot component 708. In general, the DRS core 700 may perform diagnosis and recover for the recovery environment 200, for example, by interfacing diagnostic tools and recovery tools to a diagnostic and recovery interface portion of the user interface 702. The core 700 may include the libraries of diagnostic and recovery tools used by the DRS 210.

DRS user interface 702 presents a wizard interface that guides a user through the recovery process. The wizard user interface 702 presents diagnosis results to the user, and may ask for user permission to perform certain recovery actions (such as a system roll back), or in manual operating mode all recovery actions. That is, in the latter manual operation, the user interface 702 may direct the core 700 to perform recoveries. In manual or automatic mode, the wizard user interface 702 may have timed response controls that wait for user input only for a certain amount of time, whereafter if the user does not respond within that time, the wizard user interface 702 may instruct the core 700 to continue with the diagnosis and/or recovery processes.

The DRS configuration manager 704 may be responsible for maintaining DRS configuration data read from the registry. This configuration data may include information about advanced recovery applications, support applications, and group policy settings for the user interface 702. The configuration manager 704 may be used for extensibility purposes as well to allow the addition of additional diagnostic and/or recovery tools for execution by the DRS 210, in addition to those already contained with the core 700. Such extensibility may be utilized via automated or manual process execution, for example, by initiating a keyboard command, like F8. For the latter example, upon initiating an F8 key-stroke environment, the computer system 110 may boot into the recovery environment 200, where the DRS 210 identifies that a manual boot has been initiated by looking at the boot loader and seeing no boot failures. The user may then manually select from a list of the diagnostic and/or recovery tools to execute. Whether in automated or manual operation of the DRS 210, extensibility provides the ability to add tools to the DRS 210, such as an OEM adding their own image repair tools in place of the back-up software for the target operating system 144. Extensibility may provide the ability to offer separate support-specific information and support tools particular to an OEM, as well, such as dumping system boot failure data to the OEMs support services via the network interface 170.

In the illustrated example, the DRS logging infrastructure 706 is the back bone of the DRS 21.0 for storing diagnostic and recovery data. The DRS core 700 may use the logging infrastructure 706 internally to pass DRS state data from one phase to another and externally to communicate state data with the user interface 702 and the post boot component 708. At the end of a recovery process, the diagnostic and recovery data may be persisted on the hard disk 141 or other storage medium for use by the DRS core 700 and post boot component 708 on next boot of the operating system 144, e.g., to determine if a re-boot attempt was successful or to determine whether a error report should be generated and sent to the remote computer 180.

DRS post boot component 708, which may be invoked when the DRS 210 is able to recover the computer system 110 to a bootable state, may be responsible for: a) writing logging events about the recovery process into the logging infrastructure; b) uploading a report about the recovery process to an online database; c) informing the user about the recovery; and d) launching any follow up recovery actions, such as disk diagnosis, during the next successful boot of the target operating system 144.

The DRS core 700 includes engines 204 and 206 and may include the diagnostic tools 302-306 and the recovery tools 312-316, although alternatively some or all of the tools may be external to the core and external to the DRS 210. The core 700 may also include the mapping data 308 and 310.

Example Diagnosis of Pre-Operating System Boot Processes

Figure 8A:
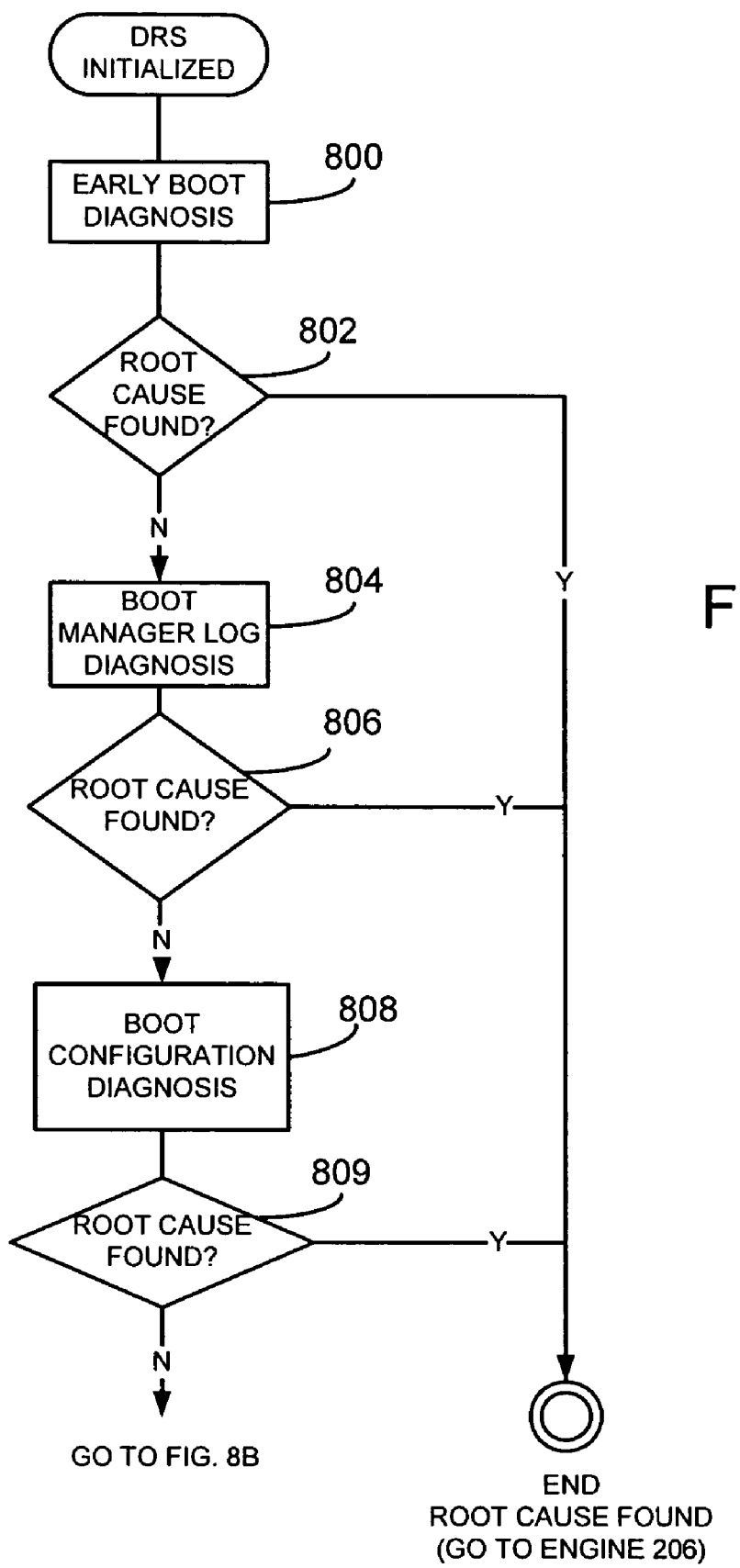
FIGS. 8A and 8B illustrate example implementations of the diagnosis of pre-operating system boot processes as may be executed by the operation of FIG. 5.
Figure 8B:
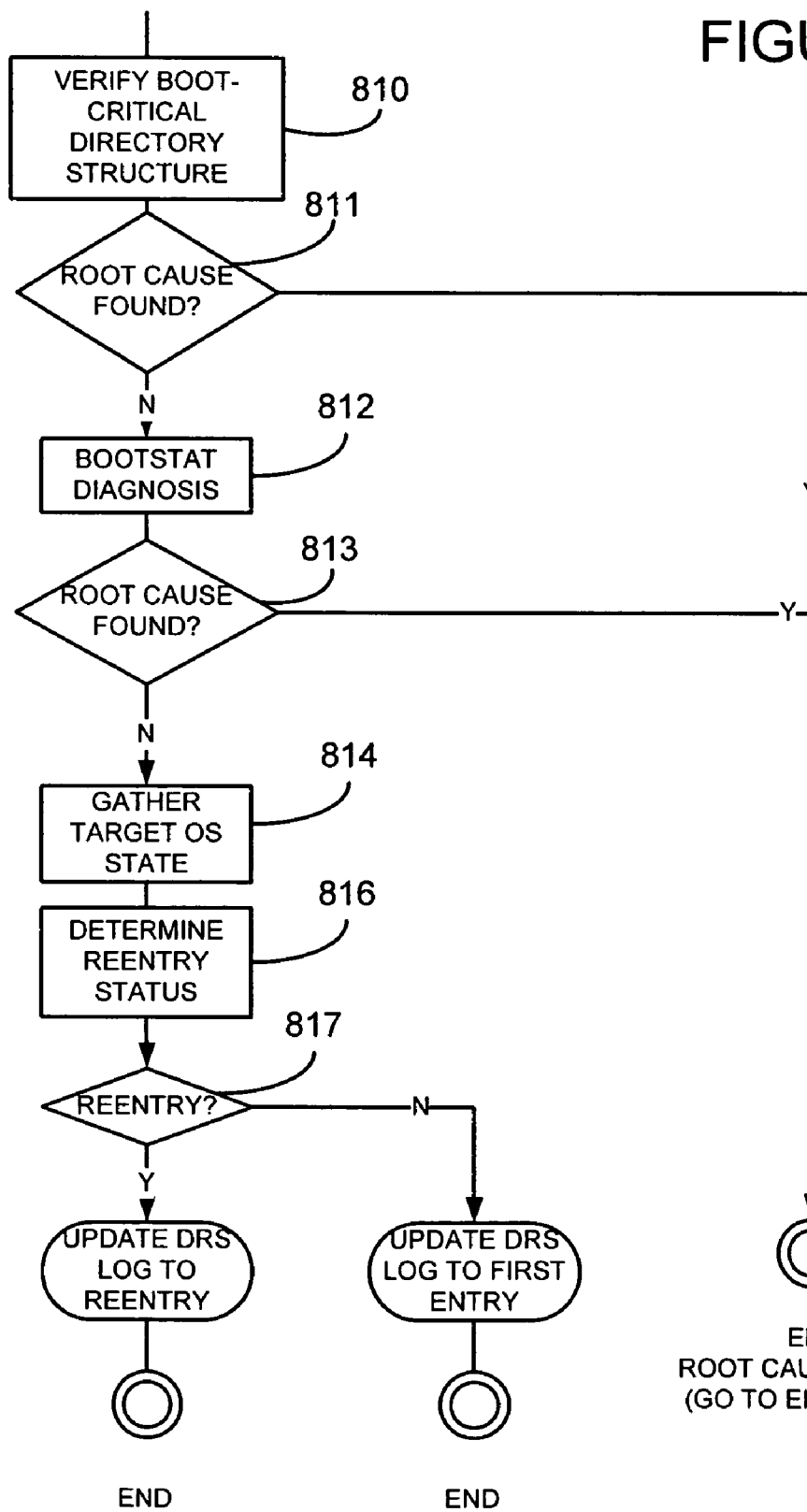

An example implementation of the pre-operating system diagnosis block 502 of FIG. 5 is illustrated in FIGS. 8A and 8B. A block 800 examines early boot processes, such as a MBR, EFI startup phase, partition table, system volume, and boot sector depending on the startup environment, to ensure that early boot processes are accurate and that there is a readable system volume. The block 800 for example may implement diagnostic processes such as those described in application Ser. No. 11/117,861. By way of example, not limitation, the block 800 may identify any of the following root causes, which are in a format that indicates what component, file, directory, code, etc. is the source of the problem and the problem associated with that item (e.g., corrupt, missing, or non-existent): RC_CORRUPT_PARTITION_TABLE; RC_CORRUPT_MBR_BOOTCODE; RC_CORRUPT_SYSTEM_VOLUME; RC_MISSING_BOOT_MANAGER; RC_CORRUPT_BOOT_MANAGER; and RC_NO_HARD_DRIVE.

If a root cause is found, then block 802 stores the root cause for the recovery process of the DRS 210 and the process ends. Yet, if no root cause is found, control passes to a boot manager log diagnosis 804, which looks at the boot manager log, e.g., created as the boot manager attempts to start the target operating system, to determine any problems the boot manager 414 may have encountered, include missing or corrupt operating system loader logs, missing or corrupt boot configuration files, or a corrupted boot volume. By way of example, not limitation, the diagnosis block 806 may identify the following root causes: RC_MISSING_OS_LOADER; RC_CORRUPT_OS_LOADER; RC_CORRUPT_BOOT_CONFIG; RC_MISSING_BOOT_CONFIG, and RC_CORRUPT_BOOT_VOLUME.

In the illustrated example, a boot configuration diagnosis block 808 performs additional checks on the boot configuration, where blocks 800 and 804 have not identified a root cause. For example, if a target operating system has been identified, the block 808 may perform additional checks on the corresponding boot entry. Whereas, if a target operating system has not been identified by this point, the block 808 may identify a target operating system from the boot configuration file. And if multiple instances of the operating system are listed in a boot configuration file, then the user may be prompted to choose one through the user interface 702, where checks will be performed on the selected boot entry. Diagnoses performed by block 808 are boot process specific. As such, on EFI systems the diagnosis block 808 may also verify that the firmware boot configuration points to the WINDOWS boot manager on the EFI System Partition (ESP). By way of example, not limitation, a block 809 may identify the following root causes: RC_MISSING_BOOT_CONFIG; RC_CORRUPT_BOOT_CONFIG; RC_CORRUPT_BOOT_ENTRY; and RC_CORRUPT_FIRMWARE_BOOT_CONFIG.

Figure 9:
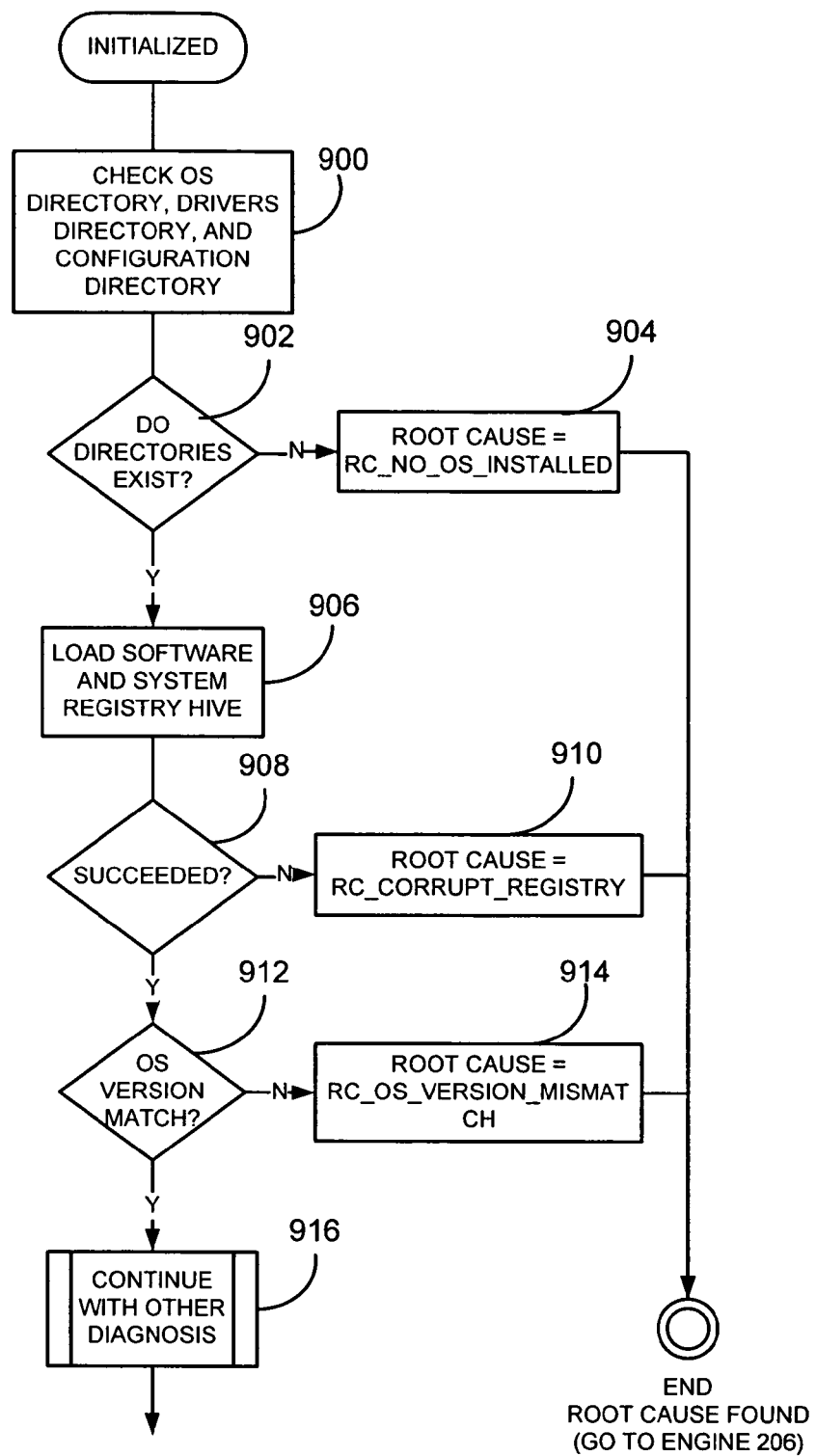
FIG. 9 illustrates an example implementation of a component of the diagnostics in FIGS. 8A and 8B.

Referring now to FIG. 8B and the continuation of the system diagnosis of block 406, a block 810 verifies boot-critical directory structure to diagnose a root cause. By way of example, not limitation, the block 810 may identify the following root causes: RC_CORRUPT_REGISTRY; RC_COR- RUPT_BOOT_VOLUME; RC_NO_OS_INSTALLED; and RC_OS_VERSION_MISMATCH. An example implementation of the diagnosis at block 810 is provided in FIG. 9.

A block 900 may verify whether the directories used by the boot process and critical to operating system boot are available. For example, in a WINDOWS environment, the block 900 may identify whether the following directories exist: WinDir, WinDir\System32, WinDir\System32\Config and WinDir\System32\Drivers. A block 902 may identify the root cause data element as RC_NO_OS_INSTALLED at block 904 if at least one the directories does not exist. A block 906 verifies that the software and system registry hives exist and can be loaded. Upon a failed load of the software and the system registry hive, a block 908 passes control to a block 910 that identifies the root cause as a RC_CORRUPT_REGISTRY. Block 912 determines if the operating system version matches that of the recovery environment 200 and correspondingly passes control to block 916 to continue with other diagnosis or to block 914 for identification of the root cause as RC_OS_VERSION_MISMATCH.

Returning to FIG. 8B, if no root cause is identified at block 811, a block 812 performs a boot statistics diagnosis, for example, of a "bootstat.dat" file of the primary operating system directory to determine whether the primary operating system successfully booted or not. For example, after the DRS 210 has executed a recovery on the computer system 110, the DRS 210 may update a last boot succeeded Boolean value in the boot stat data file to TRUE, which value is cleared by the operating system loader when it starts. The value is useful in indicating whether the preceding boot attempt was a successful one. If the operating system loader does not execute or terminates too early, this value is not cleared.

The diagnosis block 812 may check for the version number of the structure in the boot stat data file to prevent reading incorrect information from the log. The diagnosis at block 812 may also identify when the user is re-launching the DRS 210 without rebooting the machine, thereby identifying the root cause as a RC_NO_BOOT_FAILURE, which in some examples may result in an error message to the user via the user interface 702.

After boot status data diagnosis, a block 813 identifies the root cause if found. If no root cause is found, in the illustrated example, a gather primary operating system state block 814 reads the event log of the primary operating system and collects information on the most recent successful boot information such as: the last successful boot time. A block 816 next determines whether the DRS 210 is being invoked to address a new issue (a first entry) or an old issue (reentry), for example, upon a failed recovery attempt. At block 816, the DRS 210, for example, may determine this question based on its own log and the last successful boot time information of the target operating system. The block 816 may determine if a log file exists and if not identifies to the DRS 110 that the diagnosis is the first entry. The block 816 may set the current last successful boot time to the previous last successful boot time and identify to the DRS 210 that a reentry has occurred. In the illustrated example, a block 817 determines if there has been a reentry or not.

These processes are provided by way of example not limitation. Additional, fewer, or alternative processes may be used instead.

Example Diagnosis of Operating-System Boot Processes

Figure 10A:
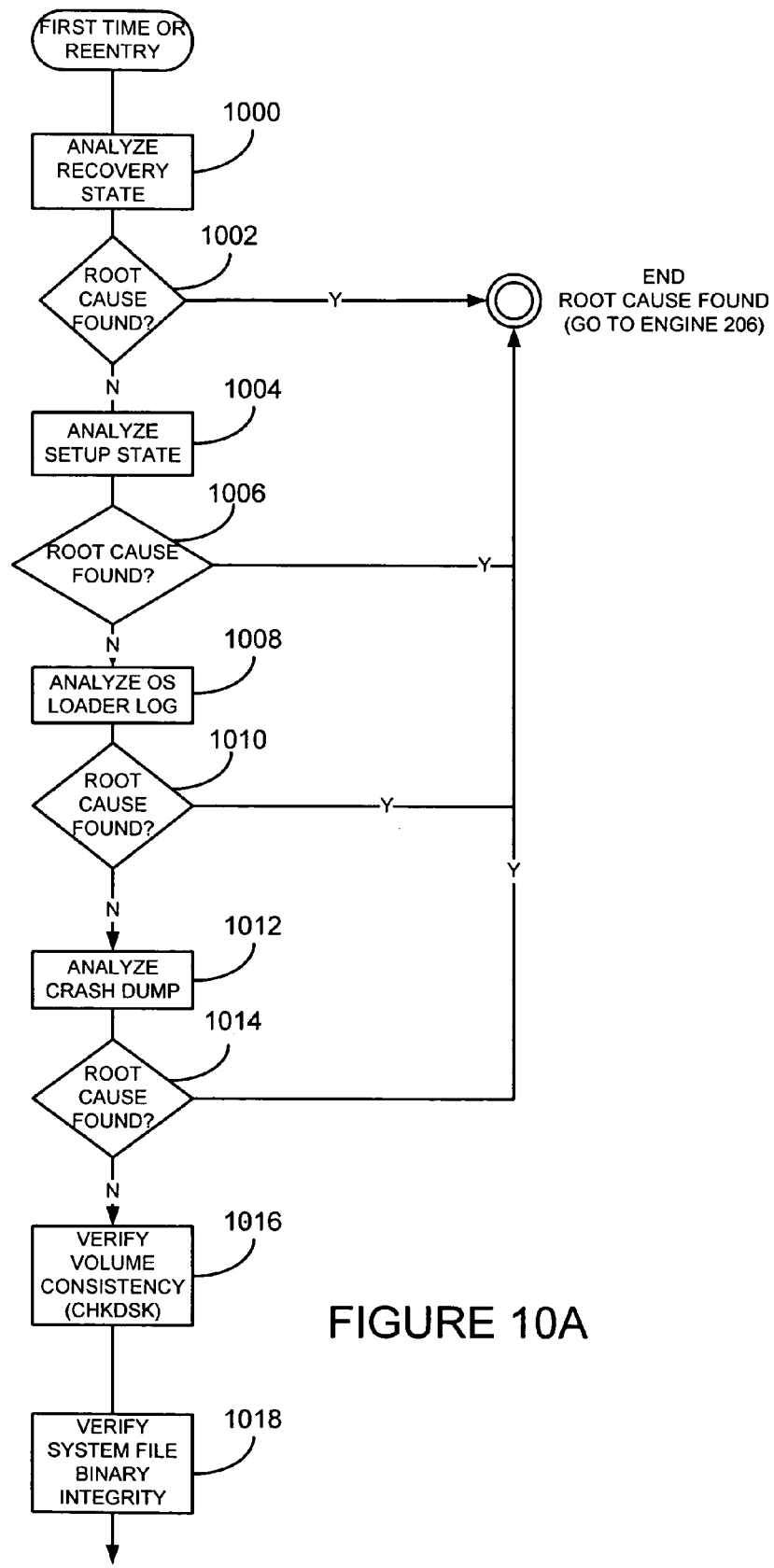
FIGS. 10A and 10B illustrate example implementations of an the diagnosis of operating-system boot processes as may be executed by the operation of FIG. 5.
Figure 10B:
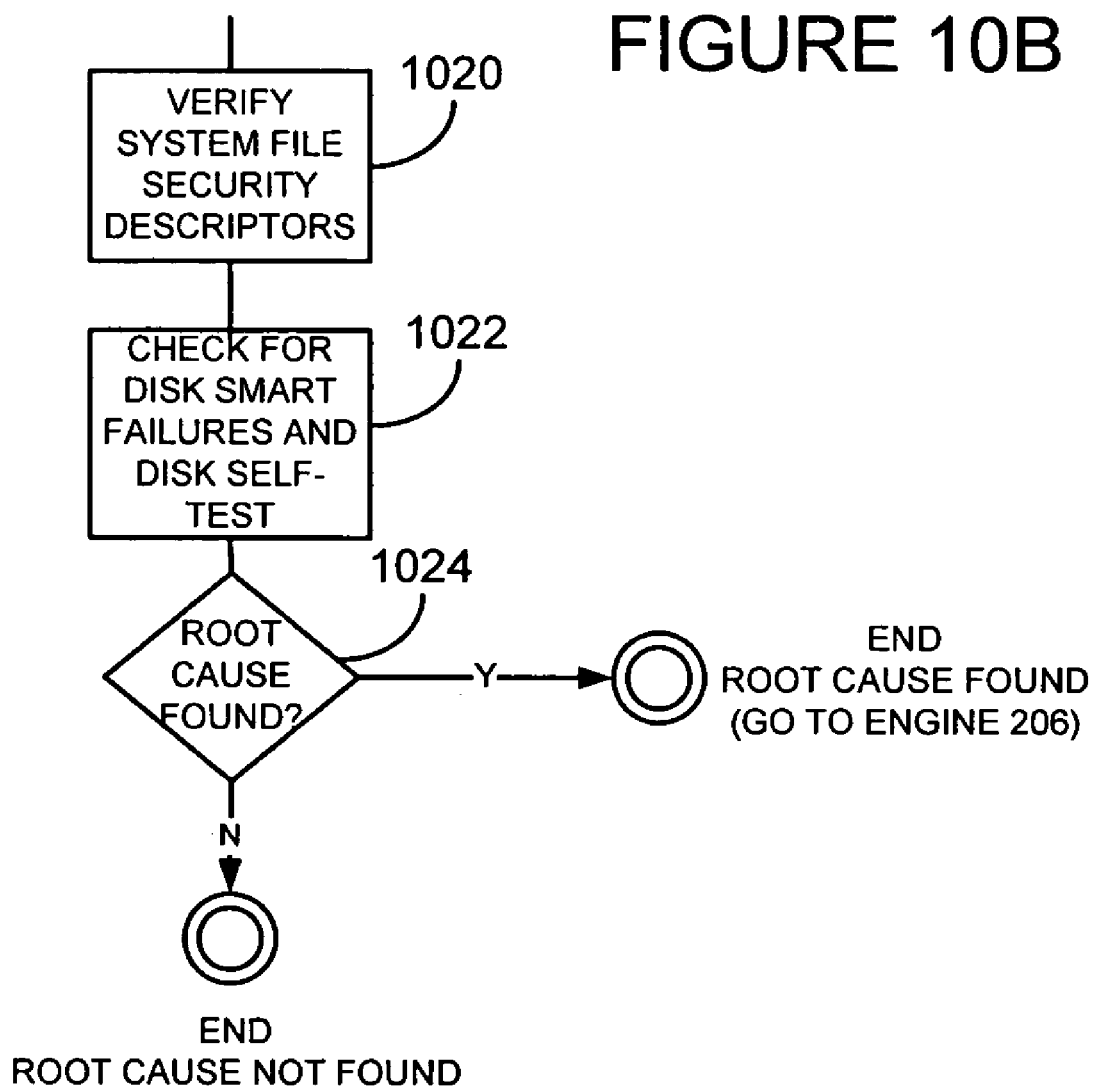

FIGS. 10A and 10B illustrate an example implementation of the operating system diagnosis, such as may be performed by blocks 510 and 514 of FIG. 5. A block 1000 analyzes the recovery state of the DRS's log from previous sessions and identifies any root causes therein, whereupon if a root cause is found block 1002 identifies the same. The number of attempts the DRS 210 makes to fix a single unbootable situation may be set to a default value, such as "5", which can be configured via a registry key for the host operating system 300. The configuration manager 704 may read these values for example. If the registry key does not exist then the default value is used. Or if the value is a "0", the "0" is ignored and the default value is used. By way of example not limitation, the root causes identified by the block 1000 may include: any previous root cause for which system recovery was used; RC_BAD_RAM; and RC_TOO_MANY_ATTEMPTS indicating if too many re-entries or re-boots have occurred.

A block 1004 analyzes the setup state for the computer system 110, for example by reading a setup registry key. By way of example not limitation, if the registry key's value is "1", then a RC_FAILURE_DURING_SETUP root cause is identified via block 1006, indicating a failure to setup the registry.

By way of example not limitation, a block 1008 analyzes the operating system loader log to identify such root causes as: RC_MISSING_SYSFILE; RC_CORRUPT_SYSFILE; and RC_CORRUPT_SYSREGISTRY. Block 1010 then identifies the root cause, otherwise a block 1012 performs a crash dump analysis, for example by checking diagnosed data against root causes in a root cause mapping table. An example diagnostic mapping table of error codes to root causes is provided below.

| Bugcheck Code | Root Cause |
| --- | --- |
| STATUS_CANNOT_LOAD_REGISTRY_FILE | RC_CORRUPT_REGISTRY |
| CONFIG_LIST_FAILED | RC_CORRUPT_REGISTRY |
| BAD_SYSTEM_CONFIG_INFO | RC_CORRUPT_REGISTRY |
| CONFIG_INITIALIZATION_FAILED | RC_CORRUPT_REGISTRY |
| REGISTRY_ERROR | RC_CORRUPT_REGISTRY |
| INACCESSIBLE_BOOT_DEVICE | RC_CORRUPT_BOOT_VOLUME |
| UNMOUNTABLE_BOOT_VOLUME | RC_CORRUPT_BOOT_VOLUME |
| KERNEL_DATA_INPAGE_ERROR | RC_CORRUPT_BOOT_VOLUME |
| KERNEL_STACK_INPAGE_ERROR | RC_CORRUPT_BOOT_VOLUME |
| VIDEO_DRIVER_INIT_FAILURE | RC_BAD_DRIVER |
| STATUS_IMAGE_CHECKSUM_MISMATCH | RC_CORRUPT_SYSFILE |
| UNABLE_TO_LOCATE_COMPONENT (0xc0000135) | RC_MISSING_SYSFILE |
| MACHINE_CHECK_EXCEPTION | RC_BAD_RAM |

This table is provided by way of example, not limitation. Additional, fewer or other root cause mappings from bug check data may be used. Further, where analysis identifies an unknown bug check that may be mapped to a root cause: RC_UNKNOWN_BUGCHECK.

For some bugchecks, the DRS 210 examines the event log of the target operating system. For example, if the dump indicates an error in a driver code, then the DRS 210 scans the event log to find out if any driver installation events have occurred. This gives an indication as to when the system was in a stable state last. By way of example not limitation, root causes that may be identified by block 1012 include: those listed in the table above, as well as RC_BAD_DISK.

If no root cause is found, a block 1014 passes control to a block 1016 that verifies volume consistency, e.g., by executing a check hard disk process on the boot volume. In a WINDOWS environment, the DRS 210 may use a ChkDskEx( ) function exposed by the fmifs.dll library, for example, or may execute the chkdsk application. In general, the check disk operation can find and fix any volume inconsistencies. It may be programmed to not only identify and fix volume errors, but also to provide the DRS 210 with error identification information. By way of example, not limitation root causes identified by the block 1016 may include: RC_CORRUPT_BOOT_VOLUME; and RC_BAD_DISK_SECTOR.

A block 1018 verifies system file binary integrity, for example, verifying the integrity of boot-critical system files. The block 1018 may identify a RC_CORRUPT_SYSFILE root cause, for example. A block 1220 (FIG. 11B) may verify system file security descriptors. In the example of WINDOWS PE as the host operating system 300, the block 1020 may verify that WINDOWS PE files in the WinDir\System32 WinDir\System32\Drivers directories have read and execute access for the computer system 110, for example, the root cause data element identified may include RC_BAD_ACL, for a bad access control list.

A block 1022 performs an analysis for disk SMART failure data and run a hard disk self test. If a disk indicates SMART failure, the DRS 210 will not try to repair the computer system 110, but instead informs the user that the hard disk 141 is bad. By way of example not limitation, the root cause identified at block 1024 may include: RC_BAD_DISK.

These processes are provided by way of example not limitation. Additional, fewer, or alternative processes may be used instead.

Example Determination of Recovery Tools

Figure 11:
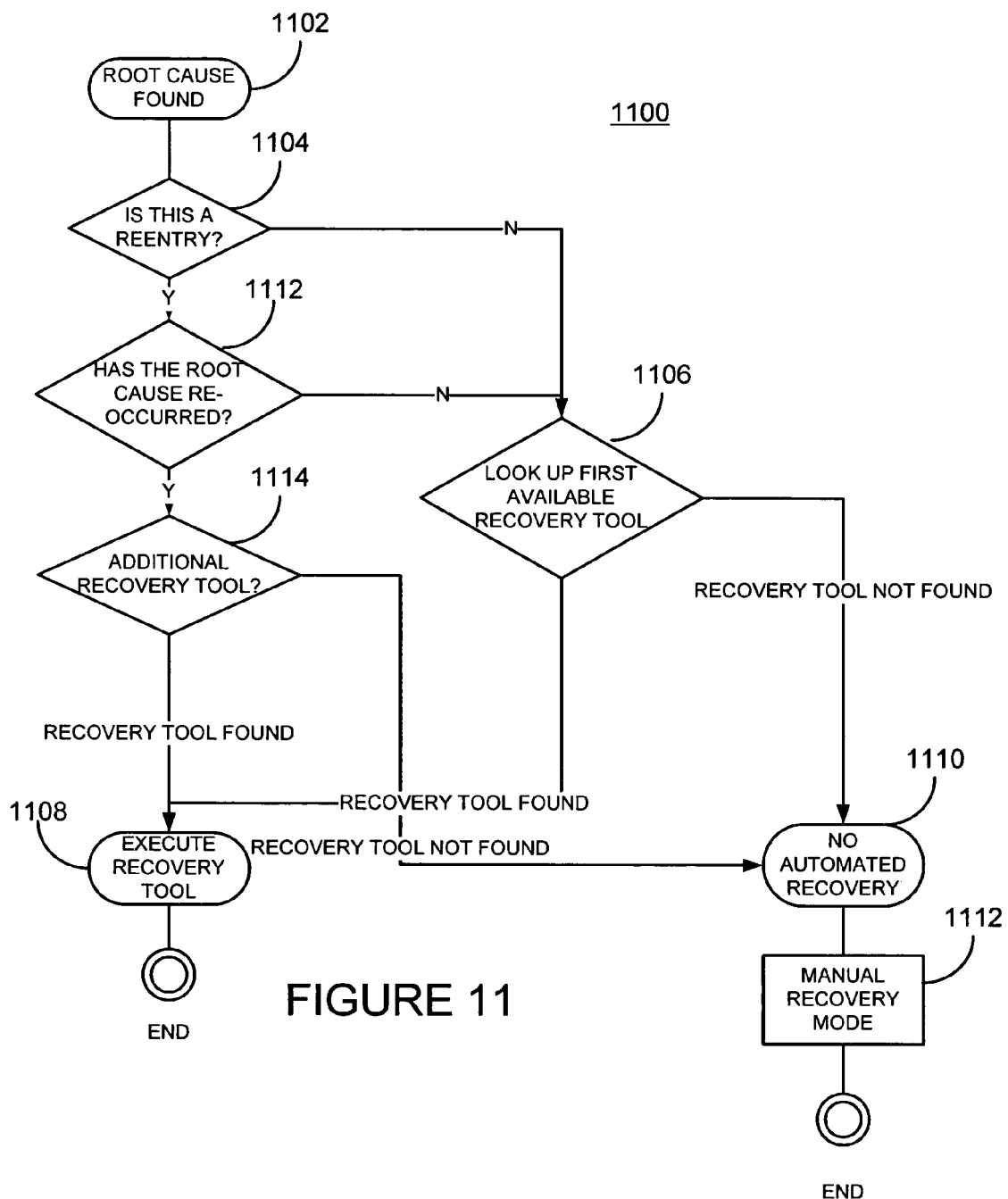
FIG. 11 illustrates an example recovery operation as may be executed by the operation of FIG. 5.

As noted above, the blocks 604 and 608 of FIG. 6 choose from among the available recovery tools associated with a diagnosed root cause. For example, the blocks 604 and 608 may access data that maps root causes such as those identified in the above examples with associated recovery tools for implementation. FIG. 11 illustrates a similar process showing an automated recovery tool identification and execution and a manual identification and execution of a recovery tool, where the later is implemented, at least in the illustrated example, when the automated recovery process fails to identify a successful recovery tool.

For a process 1100, a diagnosed root cause is provided to block 1102, and the process 1100 determines if this entry in the process is a first entry or not at block 1104. If the entry is not a reentry then control is passed to block 1106 which looks up the first available tool or the primary tool and executes the recovery tool at block 1108 and reboots the computer system 110. If no recovery tool has been associated with the root cause from block 1102, block 1106 passes control to a block 1110 and the process 1100 may enter a manual mode 1112, where the user is allowed to the select from a list of recovery tools and execute them individually.

If this is a reentry into the process 1100, the block 1104 passes control to block 1112 which determines if the root cause has reoccurred again, for example by executing the diagnosis block, such as those described above, originally identifying the root cause. If the root cause has not previously occurred, then in the illustrated example, control is passed to block 1106 for identification of a first or the primary recovery tool. If the root cause has reoccurred, a block 1114 determines if there is a secondary recovery tool for execution by block 1108.

Example recovery tools that may be executed by the decision and recovery engine 206 include: executing a chkdsk; verifying boot manager files; testing RAM; copying files or directories from a safe servicing location such as a backup registry, driver storage location, or host operating system components, e.g., using XCOPY; system state rollback; executing a bootcfg tool; and access control list repair. The system restore may restore the root cause to a previous state, e.g., that of the most recently successful boot. XCOPY, a DOS command that allows the DRS 210 to copy a project, application, directory or file from one location to another, may be used for example to copy safe operating system files for the target operating system to appropriate system directories where such files are missing or corrupted. Version verification of the servicing location storing the files may be performed by a separate verification API.

The chkdsk may be executed on the system volume, i.e., the volume on which the operating system loader and the rest of the operating system resides, and if useful the boot volume, i.e., the volume on which the boot manager, boot configuration and other boot critical files reside. Once the chkdsk operation is completed, the DRS 210 may verify that boot-critical directories are present on the boot volume of the hard disk.

For recovery from root causes associated with early boot processes such as those diagnosed at the block 800 an early boot recovery process may be executed. For a missing or corrupted boot code or a corrupted boot sector for example, the early boot recovery process may replace the boot code or boot sector with a back up boot code or boot sector, respectively, where these items may be accessed from the recovery partition 148 or from memory blocks of the target operating system 144. A detailed example of an early boot metadata diagnostic and recovery process as may be implemented by the DRS 210 for early boot processes is described in the U.S. application Ser. No. 11/117,861.

In some examples, certain recovery tools may take priority over other recovery tools. For example, chkdsk may take priority over system restore which may take priority over other recovery tools. That is, chkdsk takes the highest priority, and system restore takes the second highest priority, where the rest of the recovery tools can be executed in any order amongst themselves. That means if chkdsk and system restore are among multiple recovery tools available for a root cause, then chkdsk is executed first then system restore and so on. It should also be noted that the recovery environment 200 may execute chkdsk as soon as possible as diagnostic tools may be altered after a chkdsk operation. Furthermore, the chkdsk operation may need to be run only once during a recovery session, such that if additional root causes are identified and mapped to a previously executed root cause, the same chkdsk recovery tool will not be executed multiple times. Further still, the results of a diagnosis or a recovery action may mandate that a particular recovery tool, otherwise available to address an identified root cause, should not be executed. For example, if a root cause or recovery action indicates that there are errors on the hard disk 141 then the system restore recovery tool should not be used.

This prioritization of the recovery tools may be a root cause specific prioritization or a universal prioritization for all root causes. The prioritization may be static and unalterable by the user. However, in other examples, the recovery environment 200 may alter the prioritization. For example, after a successful recovery from a secondary recovery tool, the recovery environment 200 may determine that a secondary recovery tool is more successful than the primary recovery tool and prioritize the secondary tool as the primary recovery tool, which may be done by altering the order of the secondary and primary recovery tools in a recovery mapping table.

By way of example, the following table shows a recovery tool mapping between example root causes and various automated recovery actions. If the first or primary recovery tool fails or is not available, the second tool is used. Where multiple recovery tools are available, they are listed in subsequent columns to the Recovery Tool 1 column, of which one additional column is shown, Recovery Tool 2. In the example of the illustrated table, some of the root causes are not associated with a recovery tool, to show that in some examples a mapping may include no recovery tool actions. Further, although some example recovery tools are shown, the techniques described herein are not limited thereto, or to a particular mapping thereof. Additional, fewer, or other recovery tools may be associated with additional, fewer, or other diagnosed root causes.

The DRS 210 may be programmed so that only certain of the root causes may be addressed under both manual and automatically decision and recovery. The manual mode at block 1112, for example, may provide a listing of those manual recovery tools, if any, available for execution by the user. This listing may include recovery tools available in automatic mode, as well as additional recovery tools available only in a manual mode. By way of example, not limitation, the table below lists root causes where manual recovery may be an option, in an example implementation.

| Root Cause Identifier | Manual Recovery |
|---|---|
| RC_NO_HARD_DRIVE | No |
| RC_FAILURE_DURING_SETUP | |
| RC_NO_BOOT_FAILURE | |
| RC_OS_VERSION_MISMATCH | |
| RC_BAD_DISK | |
| RC_BAD_RAM | |
| RC_CORRUPT_FIRMWARE_BOOT_CONFIG | |
| RC_CORRUPT_MBR_BOOTCODE | Yes |
| RC_TOO_MANY_ATTEMPTS | |

| Root Cause Identifier | Recovery Tool 1 | Recovery Tool 2 |
|---|---|---|
| RC_NO_HARD_DRIVE | <NONE> | <NONE> |
| RC_TOO_MANY_ATTEMPTS | | |
| RC_FAILURE_DURING_SETUP | | |
| RC_NO_BOOT_FAILURE | | |
| RC_OS_VERSION_MISMATCH | | |
| RC_BAD_DISK | | |
| RC_CORRUPT_MBR_BOOTCODE | Early Boot Metadata Diagnosis and Recovery | <NONE> |
| RC_CORRUPT_PARTITION_TABLE | | |
| RC_CORRUPT_SYSTEM_VOLUME | Chkdsk + verify/repair boot manager files. | |
| RC_CORRUPT_BOOT_VOLUME | Chkdsk + verify/repair boot-critical directory structure | <NONE> |
| RC_BAD_DISK_SECTOR | ChkDsk + verify/repair files for system volume. | <NONE> |
| RC_BAD_RAM | RAM Tester | <NONE> |
| RC_MISSING_OS_LOADER | XCOPY (from Servicing Location) | System Restore |
| RC_CORRUPT_SYSFILE | | |
| RC_MISSING_SYSFILE | | |
| RC_CORRUPT_OS_LOADER | | |
| RC_MISSING_BOOT_MANAGER | | |
| RC_CORRUPT_BOOT_MANAGER | | |
| RC_MISSING_BOOT_CONFIG | BootCfg | <NONE> |
| RC_CORRUPT_BOOT_CONFIG | | |
| RC_CORRUPT_BOOT_ENTRY | | |
| RC_CORRUPT_FIRMWARE_BOOT_CONFIG | | |
| RC_NO_OS_INSTALLED | | |
| RC_CORRUPT_REGISTRY | System Restore | Registry Backup Copy Restore |
| RC_CORRUPT_SYSREGISTRY | | |
| RC_BAD_DRIVER | System Restore to the restore point corresponding to the install of the bad driver or the patch. | System Restore to the first restore point before the last successful boot. |
| RC_UNKNOWN_BUGCHECK | System Restore to the latest restore point before the last successful boot | |
| RC_BAD_ACL | Access Control List (ACL) Fix up | System Restore |

-continued

| Root Cause Identifier | Manual Recovery |
|---|---|
| RC_CORRUPT_SYSTEM_VOLUME | |
| RC_CORRUPT_PARTITION_TABLE | |
| RC_CORRUPT_BOOT_VOLUME | |
| RC_BAD_DISK_SECTOR | |
| RC_MISSING_OS_LOADER | |
| RC_CORRUPT_SYSFILE | |
| RC_MISSING_SYSFILE | |
| RC_CORRUPT_OS_LOADER | |
| RC_MISSING_BOOT_CONFIG | |
| RC_CORRUPT_BOOT_CONFIG | |
| RC_CORRUPT_BOOT_ENTRY | |
| RC_NO_OS_INSTALLED | |
| RC_CORRUPT_REGISTRY | |
| RC_CORRUPT_SYSREGISTRY | |
| RC_UNKNOWN_BUGCHECK | |
| RC_BAD_DRIVER | |
| RC_BAD_ACL | |

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What we claim is:

1. A computer-storage medium having computer executable instructions for performing steps of recovering from boot failure of a target operating system on a computer system comprising:
   determining an occurrence of the boot failure;
   launching a recovery environment, the recovery environment including a host operating system and a diagnostic and recovery system (DRS) executing under the host operating system, wherein the DRS includes a diagnostic engine and a decision and recovery engine, and wherein the host operating system is separate from the target operating system;
   identifying, by the diagnostic engine, a root cause of the boot failure, including:
      accessing a plurality of diagnostic tools, each of which diagnoses a different component of a boot process of the target operating system,
      obtaining diagnostic data corresponding to the boot failure from the plurality of diagnostic tools,
      accessing a diagnostic mapping table, the diagnostic mapping table including a mapping of various diagnostic data to various root cause data, and
      determining the root cause of the boot failure based on the diagnostic mapping table;
   in response to the identification of the root cause, identifying, by the decision and recovery engine, a plurality of recovery actions associated with the root cause, including:
      accessing a recovery table, the recovery table including a mapping of various root causes to various recovery actions, and
      determining, via the recovery table, a plurality of probable recovery actions based on the root cause wherein the probable recovery actions are actions that are likely to correct the root cause of the boot failure;
   creating a priority of the probable recovery actions based on the likelihood of correcting the root problem;
   displaying the probable recovery action in priority order;
   allowing a selection of probable recovery actions to be executed; and
   sequentially and separately executing each of the selected probable recovery actions, starting with a highest priority probable recovery, until the computer system is able to boot successfully.

2. The computer-storage medium of claim 1, the computer readable medium having further executable instructions for performing steps of
   recovering from the boot failure comprising:
      rebooting the computer system;
      determining the occurrence of a reboot failure; and
      identifying another recovery action associated with the root cause.

3. The computer-storage medium of claim 1, the computer readable medium having further executable instructions for performing steps of recovering from the boot failure comprising:
   rebooting the computer system;
   determining the occurrence of a reboot failure; and
   identifying another root cause of the boot failure.

4. The computer-storage medium of claim 1, having further executable instructions comprising diagnosing pre-operating system boot processes for the root cause.

5. The computer-storage medium of claim 4 having further executable instructions for diagnosing the pre-operating boot processes for the root cause comprising:
   examining partition table data for a system volume storing the target operating system; and
   examining boot initiation data for the system volume.

6. The computer-storage medium of claim 1, having further executable instructions comprising diagnosing operating system boot processes for the root cause.

7. The computer-storage medium of claim 6 having further executable instructions for diagnosing the operating system boot processes comprising examining logged data from operating system boot processes.

8. A computing apparatus, comprising:
   a display unit that is capable of generating video images;
   an input device; and
   a processing apparatus operatively coupled to said display unit and said input device, said processing apparatus comprising a processor and a memory operatively coupled to said processor, said processing apparatus being programmed to:
      detect a boot failure corresponding to a target operating system of the computing apparatus;
      launch a recovery environment, the recovery environment including a host operating system and a diagnostic and recovery system (DRS) executing under the host operating system, wherein the DRS includes a diagnostic engine and a decision and recovery engine, and wherein the host operating system is separate from the target operating system;
      via the diagnostic engine of the DRS, diagnose a boot process of the computing apparatus to identify a root cause of the boot failure, including:

accessing a plurality of diagnostic tools, each of which diagnoses a different component of the boot process, obtaining diagnostic data corresponding to the boot failure from the plurality of diagnostic tools, accessing a diagnostic mapping table, the diagnostic mapping table including a mapping of various diagnostic data to various root cause data, and determining the root cause of the boot failure based on the diagnostic mapping table;

in response to the identification of the root cause, identify, via the decision and recovery engine of the DRS, a plurality of recovery actions associated with the root cause, including:

accessing a recovery table, the recovery table including a mapping of various root causes to various recovery tools, and determining, via the recovery table, a plurality of probable recovery actions corresponding to a subset of the various recovery tools, the determining based on the root cause and wherein the probable recovery actions are actions that are likely to correct the root cause of the boot failure;

create a priority of the probable recovery actions based on the likelihood of correcting the root problem;

display the probable recovery action in priority order;

allow a selection of probable recovery actions to be executed; and sequentially and separately execute each of the selected probable recovery actions, starting with a highest priority probable recovery action, until the computer system is able to boot successfully.

9. The computing apparatus of claim 8, further comprising a system volume storing the target operating system and a boot volume storing the host operating system.

10. The computing apparatus of claim 9, further comprising a partitionable computer storage medium having a first partition as the system volume and a second partition as the boot volume.

11. The computing apparatus of claim 8, wherein said processing apparatus is programmed to diagnose pre-operating system boot processes of the computing apparatus to identify the root cause.

12. The computing apparatus of claim 8, wherein said processing apparatus is programmed to diagnose operating system boot processes of the computing apparatus to identify the root cause.

13. A method of recovering a computer system from a boot failure comprising: determining an occurrence of the boot failure corresponding to a target operating system of the computer system; launching a recovery environment, the recovery environment including a host operating system and a diagnostic and recovery system (DRS) executing under the host operating system, wherein the DRS includes a diagnostic engine and a decision and recovery engine, and wherein the host operating system is separate from the target operating system; identifying, by the diagnostic engine of the DRS, a root cause of the boot failure, including: accessing a plurality of diagnostic tools, each of which diagnoses a different component of a boot process of the target operating system, obtaining diagnostic data corresponding to the boot failure from the plurality of diagnostic tools, accessing a diagnostic mapping table, the diagnostic mapping table including a mapping of various diagnostic data to various root cause data, and determining the root cause of the boot failure based on the diagnostic mapping table; in response to the identification of the root cause, identifying, by the decision and recovery engine of the DRS, a plurality of recovery actions associated with the root cause, including: accessing a recovery table, the recovery table including a mapping of various root causes to various recovery actions, and determining, via the recovery table, a plurality of probable recovery actions based on the root cause, wherein the plurality of probable recovery actions attempt to correct a failure in storage of data related to the root cause of the boot failure and, wherein the plurality of probable recovery actions are actions that are likely to correct the root cause of the boot failure; creating a priority of the probable recovery actions based on the likelihood of correcting the root problem; displaying the probable recovery action in priority order; allowing a selection of probable recovery actions to be executed; and sequentially and separately executing each of the selected probable recovery actions, starting with a highest priority probable recovery action, until the computer system is able to boot successfully.

14. The method of claim 13, further comprising: diagnosing a pre-operating system boot process of the computer system to identify the root cause; and in response to the diagnosing the pre-operating system boot process, diagnosing an operating-system boot process to identify the root cause.

15. The method of claim 13, further comprising: logging diagnostic and recovery data; and communicating the logged diagnostic and recovery data to a remote user.

* * * * *